United States Patent [19]

Firmin

[11] Patent Number: 4,516,352
[45] Date of Patent: May 14, 1985

[54] ARTIFICIAL CRAWFISH LURE WITH DORSAL AND VENTRAL SEAM

[75] Inventor: Herman P. Firmin, Baton Rouge, La.

[73] Assignee: Knight Manufacturing Company, Inc., Tyler, Tex.

[21] Appl. No.: 490,499

[22] Filed: May 2, 1983

Related U.S. Application Data

[63] Continuation-in-part of Ser. No. 400,296, Jul. 21, 1982.

[51] Int. Cl.³ .............................................. A01K 85/00
[52] U.S. Cl. ................................... 43/42.26; 43/42.39; 43/42.37; D22/27
[58] Field of Search ................. 43/42.53, 42.26, 42.24, 43/42.1, 42.37, 42.45; D22/27

[56] References Cited

U.S. PATENT DOCUMENTS

| | | |
|---|---|---|
| 432,436 | 7/1890 | Pflueger . |
| 994,927 | 6/1911 | Jefferson . |
| 1,888,221 | 11/1932 | Coffin . |
| 2,341,999 | 2/1944 | Lennington ........................ 43/42.53 |
| 2,663,964 | 12/1953 | Martin . |
| 2,690,026 | 9/1954 | King . |
| 2,854,779 | 10/1958 | Jackson . |
| 3,349,513 | 10/1967 | Jeff . |
| 3,389,490 | 6/1968 | Peters et al. ......................... 43/42.1 |
| 3,490,165 | 1/1970 | Thomassin . |
| 3,959,060 | 5/1976 | Jones ................................... 43/42.53 |
| 3,964,203 | 6/1976 | Williams, Jr. ....................... 43/42.02 |

OTHER PUBLICATIONS

Burke Flexo-Products Co. Cat., placed in patent files 11/4/53.
*Injection Mould Design*, R. G. W. Pye, 1968, pp. 168-170.
Rebel 2.
Mann Hackleback.
Crawdad 6A XC3 and Crawdad 2A XC7 Bassmaster Magazine.
Rebel, adv.
Mann's Cajun Crawdad, adv.
Killer Krawdad, adv.
SnagProof Soft Craw, adv.
Bagley's Crayfish Bassmaster Magazine, adv.

*Primary Examiner*—Nicholas P. Godici
*Assistant Examiner*—Chris McKee
*Attorney, Agent, or Firm*—Jerry W. Mills; Gregory M. Howison; Nina L. Medlock

[57] ABSTRACT

An artificial crawfish lure. The lure (10) comprises a resilient body (12) and a hook assembly (14). The resilient body (12) is shaped and dimensioned to resemble a crawfish and comprises a head portion (28), a midbody portion (30) and a cantilevered tail portion (32). The cantilevered tail portion (32) is an arcuate member extending in a spiral manner, downwardly, inwardly then rearwardly of the midbody portion. The tail portion terminates in a fin member (44) which is disposed substantially perpendicular to the midbody portion. A fabrication seam (46) is disposed on the ventral side of the head (28), midbody (30) and tail portions (32) and a fabrication seam (52) is disposed on the dorsal side of the head (28), midbody (30) and tail (32) portions. The fabrication seams (46) and (52) allow lateral movement of the tail portion (32). When the lure is pulled backwards through the water, water flowing around the tail portion imparts an oscillation to the cantilevered fin member, causing the lure to simulate the backward swimming motion of a crawfish.

1 Claim, 3 Drawing Figures ed, the process of molding often results in
the paws 42 and feelers 36 being twisted or turned with respect to the seam axis.

ARTIFICIAL CRAWFISH LURE WITH DORSAL AND VENTRAL SEAM

This is a continuation-in-part application of patent application Ser. No. 400,296 filed July 21, 1982, still pending.

TECHNICAL FIELD

This invention relates to the art of fishing, and more particularly to an artificial crawfish lure for attracting and catching fish.

BACKGROUND ART

Fishing for commercial or sporting purposes is a major industry. To be effective, an artificial lure containing a hook must simulate the appearance of the bait as closely as possible and exhibit movements which closely resemble the swimming characteristics of the creature. This is particularly true of creatures such as the crawfish which exhibit a somewhat unusual movement of backwards swimming.

Although lures have been designed which simulate the appearance of a crawfish, these lures fail to simulate their movements. For example, U.S. Pat. No. 3,389,490 to Peters discloses a crawfish lure formed of thermal plastic in which the legs or paws are designed to move so as to simulate motion. As the lure is pulled through the water, the body may oscillate, but the tail does not simulate the swimming motion of a crawfish. Such a lure is not effective because many fish recognize their prey according to its motion. In addition, prior lures have been fabricated utilizing a mold comprised of a top and bottom portion. The portions attach together on the sides thereof, thereby resulting in a lure with a seam on the sides thereof. This side seam restricts lateral movement to some extent resulting in unlifelike movement. Accordingly, an artificial crawfish lure is needed which resembles a crawfish in appearance and which simulates its backwards swimming motion.

SUMMARY OF THE INVENTION

In accordance with one aspect of the present invention, an artificial crawfish lure is provided which simulates the backwards swimming motion of a crawfish when the lure is pulled through the water. The lure comprises an elongated body having the general shape of a crawfish comprising a head portion, a midbody portion and a cantilevered tail portion terminating in a relatively flat fin substantially perpendicular to the midbody portion. The midbody is disposed rearwardly of the head portion and the tail portion is disposed downwardly, inwardly then rearwardly of the midbody portion to form an increasingly tapered arch. The cantilevered arch member acts as a spring member to permit the flat fin to oscillate in response to water flowing around the tail portion as the lure is drawn backwards through the water.

BRIEF DESCRIPTION OF THE DRAWINGS

A more complete understanding of the invention may be had by reference to the following Detailed Description when taken in conjunction with the accompanying Drawings in which.

DETAILED DESCRIPTION

Figure 1:
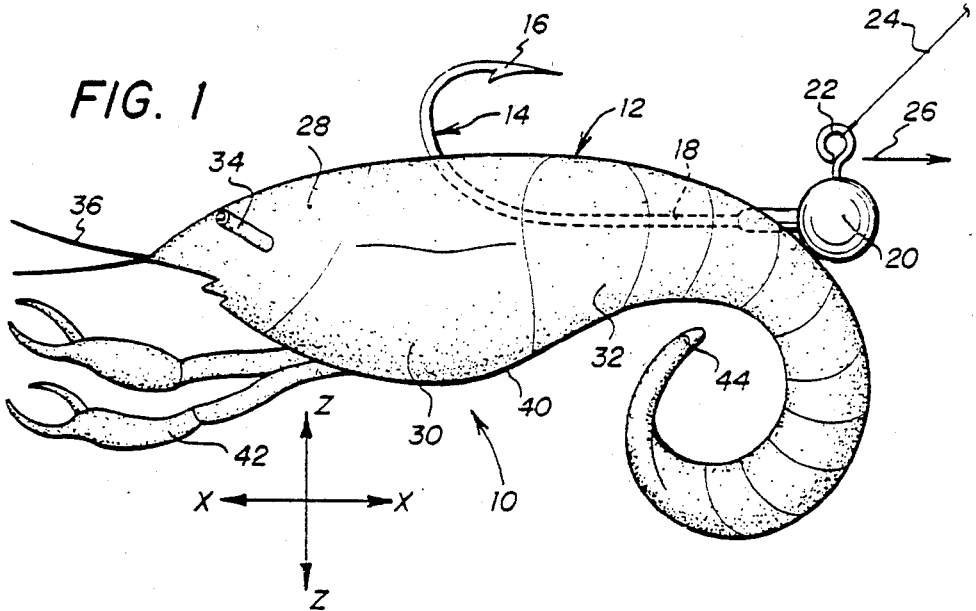
FIG. 1 is a side view of the artificial crawfish lure of the present invention.
Figure 2:
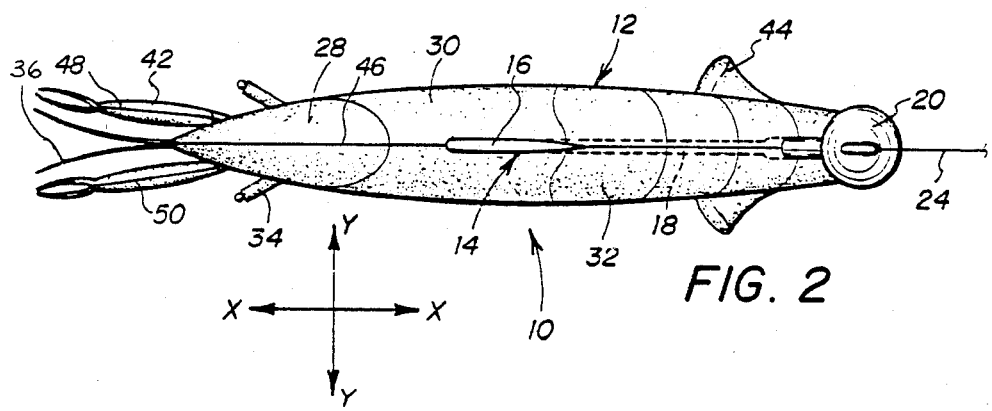
FIG. 2 is a top view of the artificial crawfish lure of FIG. 1.
Figure 3:
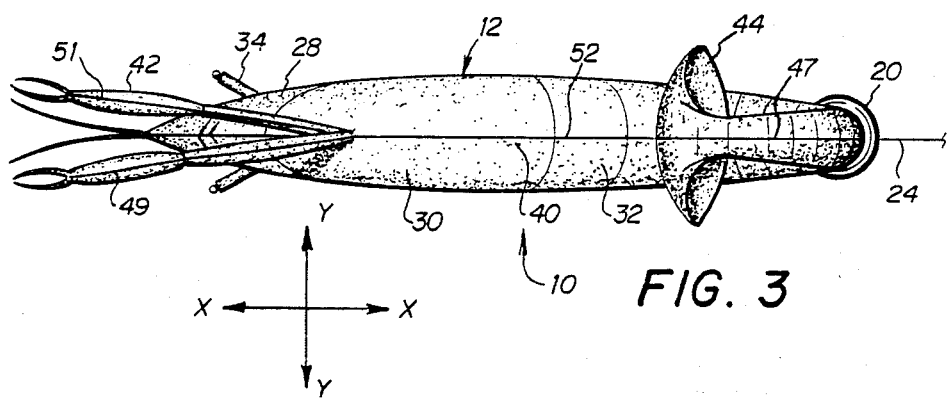
FIG. 3 is a bottom view of the artificial crawfish lure of FIG. 2.

Referring now to the Drawings, in which like reference characteristics designate like or corresponding parts throughout all three views, the preferred embodiment of an artificial crawfish lure forming the present invention is illustrated in FIGS. 1-3. The artificial lure 10 includes two assemblies, a resilient body 12 and a hook assembly 14. Resilient body 12 is preferably formed or molded of a suitable elastomeric material selected from the thermoplastic polymer family, such as, for example, polyvinyl chloride (PVC), or what is commonly known as "worm plastic". The resilient body 12 is impaled upon hook assembly 14 by insertion of the hook assembly 14 as illustrated in FIG. 1. When the resilient body is impaled on the hook assembly in this configuration, the body is best able to simulate the appearance of a swimming crawfish as the lure is pulled backwards through the water.

Hook assembly 14 comprises a barb or hook 16 formed at one end of a shank 18, the opposite end of shank 18 being secured to a weight member 20. An eye 22 secured to the end of shank 18 adjacent weight member 20 is dimensioned to threadedly secure a length of flexible fishing line 24. As shown in FIGS. 1 and 2, the lure 10 simulates the crawfish's backward swimming motion when line 24 is pulled backwards in the direction of arrow 26 as described below in greater detail.

The resilient body member 12 is shaped and dimensioned to resemble a crawfish and comprises three major portions: a head portion 28, a midbody portion 30 and an arcuate tail portion 32. Head portion 28 is frustoconically shaped and contains a pair of eyes 34 extending from each side thereof and feelers 36 extending therefrom.

The midbody portion 30 extends rearward of head portion 28 and is integral therewith. The thickness of midbody portion 30 decreases as the abdomen 40 tapers inwardly toward the tail portion 32. A pair of paws 42 extend downwardly of the midbody portion and outwardly toward the head portion 28. Motion of the midbody portion 30 through the water causes paws 42 to oscillate up and down in the X-Z plane and in the X-Y plane.

The cantilevered tail portion 32 which is integral with the midbody portion 30 is an arch shaped member extending in a spiral manner, downwardly, inwardly then rearwardly from the midbody portion 30 to form an arch with respect to midbody portion 30 approximately 360°. Tail portion 32 is continuously tapered inwardly toward the fin 44 which is formed at the terminus thereof. Fin 44 is relatively flat and substantially disposed in the Y-Z plane.

The resilient body 12, described above, is formed or molded from an elastomeric material. In most fabrication processes, the mold is normally comprised of two parts to facilitate separation thereof when extracting the lure. This normally results in a seam at the joining of the two portions of the mold. As best seen in FIGS. 2 and 3, this fabrication process results in a dorsal seam 46 and seams 48 and 50 on the paws 42. A ventral seam 52 is disposed on the ventral portion of the body 12, as shown in FIG. 3, along with seams 49 and 51 on the underside of the paws 42. In fabrication of the body 12, the paws 42 and the feelers 36 are essentially aligned along the excess axis of the seam 46. Although shown separated in FIG. 2, the paws 42 and the feelers 36 overlap one another.

Fabrication of the resilient body 12 with the dorsal and ventral seams 46 and 52, respectively, results in increased freedom in the lateral direction. The seams 46-52 on the dorsal and ventral portions of the body 12, the paws 42, the feelers 36 and the tail 44, add an increased amount of rigidity thereto thus decreasing flexibility in the plane passing through the seams. By removing any fabrication seams from the sides of the lure 10, flexibility is maintained in a plane perpendicular to the seams 46 and 52.

As the lure is drawn through the water with line 24 moving in the direction of arrow 26, the flow past the tail portion 32 of the lure imparts force to the fin member 44. Fin member 44 is cantilevered from tail portion 32, which in turn is cantilevered from midbody portion 30 to induce pivotal motion in the X-Z plane and to a lesser extent in the X-Y plane. The resilient tail portion 32 thereby acts as a spring, causing fin member 44 to oscillate or pivot about its initial position. This motion is facilitated in the X-Y plane by the lack of seams on the side of the tail portion 44. This wiggling action of the fin as the lure is pulled backwards in the direction of arrow 26 and simulates the backwards paddling motion of the crawfish.

The particular size and configuration of the lure, of course, may be varied depending upon particular feeding preference of the species of fish sought. The lure 10 illustrated in FIGS. 1-2 may also be painted or formed of material designed to attract fish or may have eyes and scales painted thereon.

Although the preferred embodiment of the present invention has been illustrated in the accompanying Drawings and described in the foregoing Detailed Description, it will be understood that the invention is not limited to the embodiment disclosed but is capable of rearrangement, modification and substitution of parts and elements without departing from the spirit of the invention.

What is claimed is:

1. An artificial lure comprising:
   an elongated body of elastomeric material having integral head, midbody and cantilevered tail portions said midbody portion extending rearwardly of said head portion and said cantilevered tail portion extending in a spiral manner downwardly, then inwardly and then rearwardly of said midbody portion and continuously tapered therefrom to form an increasingly tapered arch of approximately 360° from a longitudinal plane of said midbody portion;
   a ventral fabrication seam formed on the ventral side of said head, midbody and tail portions;
   a dorsal seam formed on the dorsal side of said head, midbody and tail portions;
   said tail portion having a substantially circular cross-section terminating in a relatively flat fin disposed substantially perpendicular to said midbody portion with the extreme tip of said fin extending in the rearward direction such that said fin oscillates in response to water flowing around said tail portion as said lure is drawn backwards through the water;
   a pair of paws extending downwardly of said midbody portion and outwardly toward said head portion an aligned in the same plane as said dorsal and ventral fabricating seams;
   a hook means having a shank and barb formed at one end of said shank, said shank extending through said midbody and tail portions such that said barb extends above said midbody portion and said shank extends substantially parallel with said midbody portion; and
   a weight member secured to said shank at the other end thereof.

* * * * *